United States Patent [19]  [11] 3,887,649
Takida et al.  [45] June 3, 1975

[54] MOLDINGS MADE OF HYDROLYZED ETHYLENE-VINYL ACETATE COPOLYMER

[75] Inventors: Hiroshi Takida, Osaka; Yoshimi Akamatu, Amagasaki, both of Japan

[73] Assignee: Nippon Gohsei Kagaku Kogyo Kabushiki, Osaka, Japan

[22] Filed: July 18, 1974

[21] Appl. No.: 489,511

[52] U.S. Cl. ............ 260/873; 260/2.5 N; 260/2.5 P; 260/42.18; 260/42.51; 260/42.52; 260/87.3; 260/869
[51] Int. Cl. .............................................. C08g 39/10
[58] Field of Search ........................... 260/873, 87.3

[56] References Cited
UNITED STATES PATENTS
2,703,794   3/1955   Roedel .............................. 260/87.3
3,825,620   7/1974   Koleske ............................. 260/873

Primary Examiner—Murray Tillman
Assistant Examiner—J. Ziegler
Attorney, Agent, or Firm—Armstrong, Nikaido & Wegner

[57] ABSTRACT

Impact resistance of moldings made of hydrolyzed ethylene-vinyl acetate copolymer, containing 20 to 50 % by mole of ethylene and 80 to 50 % by mole of vinyl acetate and having degree of hydrolysis of at least 90 % by mole, is improved by incorporating a block-copolymerized polyester-polyether elastomer, having melting point of crystalline region of 150° to 230°C. and impact resilience of not less than 50 %, in the ratio of 2 to 100 parts by weight per 100 parts by weight of the copolymer.

5 Claims, No Drawings

MOLDINGS MADE OF HYDROLYZED ETHYLENE-VINYL ACETATE COPOLYMER

BACKGROUND OF THE INVENTION

The present invention relates to novel moldings made of hydrolyzed ethylene-vinyl acetate copolymer, more particularly to moldings having an improved impact-resistance.

The hydrolyzed ethylene-vinyl acetate copolymer has been applied to film, sheet or fiber, but never been employed as yet in the field of the so-called engineering plastics, for instance, machine parts, automobile parts, aircraft parts or electric-device parts.

Moldings made of the hydrolyzed ethylene-vinyl acetate copolymer are excellent in oil-resistance, and also superior to other resin moldings in the properties such as stiffness, hardness, tensile strength, flexural strength, compression strength, abrasion resistance and antistatic charge, but inferior in impact-resistance. Therefore, such moldings have never been employed in the field of engineering plastics for which high impact strength is necessarily required.

It has been generally attempted to incorporate a synthetic rubber such as styrene-butadiene copolymer or acrylonitrile-butadiene copolymer in order to improve the impact-resistance of resin moldings, but the impact-resistance of the hydrolyzed ethylene-vinyl acetate copolymer is not improved by such a method. Also, it has been proposed to incorporate ethylene-vinyl acetate copolymer into the hydrolyzed ethylene-vinyl acetate copolymer, but such a method is still unsatisfactory since the tensile strength and flexural strength are remarkably reduced and the impact-resistance at low temperature is insufficient though the impact-resistance at normal temperature can be improved to some extent.

OBJECTS OF THE INVENTION

It is an object of the present invention to provide moldings made of hydrolyzed ethylene-vinyl acetate copolymer having an improved impact-resistance.

A further object of the invention is to provide moldings made of hydrolyzed ethylene-vinyl acetate copolymer having an improved impact-resistance in addition to the advantageous characteristics of the copolymer such as stiffness, hardness, tensile strength, flexural strength, compression strength, abrasion-resistance and antistatic charge.

A still further object of the invention is to provide moldings made of hydrolyzed ethylene-vinyl acetate copolymer available for engineering plastics.

Another object of the invention is to provide a process for preparing moldings having an improved impact-resistance.

These and other objects of the invention will become apparent from the description hereinafter.

DETAILED DESCRIPTION

It has now been found that the above-mentioned objects can be attained by incorporating the specific block-copolymerized polyester-polyether elastomer (hereinafter referred to as "polyester-elastomer") having a melting point of crystalline region of 150° to 230°C. and an impact resilience of not less than 50% into hydrolyzed ethylene-vinyl acetate copolymer. According to the present invention, the impact-resistance at both low and normal temperature can be improved without losing the advantageous characteristics of the hydrolyzed ethylene-vinyl acetate copolymer, such as stiffness, hardness, tensile strength, flexural strength, compression strength, abrasion-resistance and antistatic charge.

The term "melting point of crystalline region" as defined herein shows the value measured by a polarizing microscope.

Also the term "impact resilience" as defined herein shows the value measured according to the provision of the Physical Testing Methods for Vulcanized Rubber in JIS K 6301.

The hydrolyzed ethylene-vinyl acetate copolymer is generally prepared by polymerizing ethylene and vinyl acetate and then hydrolyzing the obtained copolymer with a hydrolyzing catalyst. The hydrolyzed ethylene-vinyl acetate copolymers employed in the present invention are those having an ethylene content of 20 to 50% by mole, a vinyl acetate content of 80 to 50% by mole and a degree of hydrolysis in vinyl acetate component of not less than 90% by mole. Especially, the hydrolyzed copolymer having an ethylene content of 25 to 40% by mole, a vinyl acetate content of 75 to 60% by mole and a degree of hydrolysis in vinyl acetate component of not less than 95% by mole is preferably employed. Also, in the present invention, hydrolyzed ethylene-vinyl acetate copolymer having an intrinsic viscosity within the range of 0.7 to 1.5 dl./g. in a mixture of phenol and water (87 : 13 by weight) at 30°C. is generally employed. It should be understood that the hydrolyzed ethylene-vinyl acetate copolymer employed in the present invention comprehends copolymers that not more than 5% by mole in vinyl acetate component of the copolymer is replaced with another monomer copolymerizable with ethylene and vinyl acetate, such as propylene, isobutylene, crotonic acid, acrylic acid, methacrylic acid, maleic acid and alkyl esters thereof. Hydrolyzed ethylene-vinyl acetate copolymers outside the above-mentioned range either on ethylene content or the degree of hydrolysis are not suitable for the use of engineering plastics since moldings prepared from such a copolymer are inferior in mechanical strength, hardness, water-resistance or antistatic charge.

The polyester-elastomer employed in the present invention should have a melting point of crystalline region in the range of 150° to 230°C. and an impact resilience of not less than 50%. Examples of the commercially available polyester-elastomer are PELPRENE P30B, P70B and P150B made by Toyobo Co., Ltd. and HYTREL 4055, 5555 and 6355 made by E. I. du Pont de Nemours and Company.

These polyester-elastomers consist of crystalline region of polyester and amorphous region of polyether, and polyester block and polyether block are copolymerized. The structure and physical characteristics, therefore, are entirely different from usual polyester resin, for instance, polyethylene terephthalate.

The components and the ratio thereof have not been publicized. According to our investigation by NMR analysis, polyester block consists of phthalic acids and alkylene glycols, mainly butylene glycol, and polyether block consists of polyalkylene oxide. The ratio of polyester unit and polyether unit varies in the range of about 1 : 1 to 1 : 6.

When the polyester-elastomer having a melting point of less than 150°C. is employed, the difference between the melting point of hydrolyzed ethylene-vinyl acetate copolymer and that of polyester-elastomer is so larte that compatibility of both resins becomes extremely poor. On the other hand, the incorporation of the polyester-elastomer having a melting point of more than 230°C. is not effective for improving the impact-resistance of hydrolyzed ethylene-vinyl acetate copolymer. Also, when the polyester-elastomer having an impact resilience of less than 50%, the impact-resistance tends to reduce rather than be improved.

The amount of the polyester-elastomer employed in the invention is selected from the range of 2 to 100 parts by weight, preferably 5 to 50 parts by weight, per 100 parts by weight of hydrolyzed ethylene-vinyl acetate copolymer. The polyester-elastomer in an amount of less than the above range is insufficient to improve the impact-resistance, and on the other hand, the polyester-elastomer in an amount of more than the above range makes mechanical properties poor.

According to the present invention, the impact resistance of the molding mentioned above is more improved by further incorporation of an elastomer in combination with the polyester-elastomer, which is selected from the group consisting of ethylene-vinyl acetate copolymer, ethylene-acrylate copolymer, acrylonitrile-butadiene copolymer and chlorinated polyethylene. Especially, ethylene-vinyl acetate copolymer consisting of 60 to 90% by mole of ethylene and 40 to 10% by mole of vinyl acetate is preferable. The amount of the elastomer is suitably selected from the range of 0.5 to 10 parts by weight per 100 parts by weight of the hydrolyzed ethylene-vinyl acetate copolymer. Incorporation in an amount of less than 0.5 part by weight is insufficient to improve the impact-resistance, and in more than 10 parts by weight, the compatibility of each ingredient is reduced.

The hydrolyzed ethylene-vinyl acetate copolymer composition blended with the polyester-elastomer is molded to the desired shape by means of usual manner such as injection molding, extrusion, compression molding, rotational molding, blow molding, casting or calendering. In order to maintain an appropriate flowability of resins and to prevent pyrolysis of resins, the molding is carried out to maintain the temperature of melted resins within the range of 180° to 270°C.

Also, the instant composition as stated above may be incorporated with known additives such as stabilizer, plasticizer, filler, coloring agent or foaming agent, and known reinforcing agents such as glass fiber or carbon fiber.

The present invention is more particularly described and explained by means of the following illustrative Examples, in which all parts are parts by weight and data of physical properties are the average value on five test pieces.

EXAMPLE 1

A dry blender was charged with 100 parts of pelletized hydrolyzed ethylene-vinyl acetate copolymer ($[\eta]=1.17$ dl./g.) having ethylene content of 30% by mole, vinyl acetate content of 70% by mole and degree of hydrolysis in vinyl acetate component of 99.5% by mole and 35 parts of pelletized PELPRENE P70B made by Toyobo Co., Ltd. (polyester-elastomer having a melting point of crystalline region of 205°C. and impact resilience of 71%). After mixing, the mixture were taken out and dried in a hot air dryer. Then, the mixture were provided into an injection molding machine of 3.5 oz.avdp. and the injection molding was carried out to give test pieces under the following molding conditions; nozzle temperature: 240°C., cylinder temperature at front part: 240°C., cylinder temperature at the rear part: 225°C., mold temperature: room temperature, injection pressure: 1,200 kg./cm.$^2$ and one cycle: 35 sec.

Physical properties of thus obtained test piece were measured, and it was observed that the impact-resistance of the present molding was excellent at both normal and low temperature.

The results were shown in Table 1.

As comparative Examples, the same procedures as above were repeated except that the hydrolyzed ethylene-vinyl acetate copolymer alone was employed without incorporating the polyester-elastomer (Comparative Example 1) and polyethylene terephthalate (of which melting point of crystalline region was 242°C. and impact resilience was extremely small due to being not elastomer) was employed instead of the polyester-elastomer (Comparative Example 2).

The results were also shown in Table 1.

Table 1

| | Impact strength 20°C. −20°C. | | Tensile strength | Young's modulus | Elongation | Flexural strength | Flexural modulus |
|---|---|---|---|---|---|---|---|
| | kg.cm./cm. | | kg./cm.$^2$. | dyne/cm$^2$. | % | kg./cm$^2$. | kg./cm$^2$. |
| Ex. 1 | 14.0 | 13.0 | 680 | $9.3 \times 10^9$ | 53 | 1150 | $3.3 \times 10^4$ |
| Com. Ex. 1 | 6.0 | 3.0 | 850 | $10.3 \times 10^9$ | 46 | 1320 | $4.3 \times 10^4$ |
| Com. Ex. 2 | 3.0 | 1.5 | 630 | $8.6 \times 10^9$ | 6 | 1220 | $4.8 \times 10^4$ |

(Note 1) The impact strength was measured at a temperature of 20°C. and −20°C. according to the provision of ASTM D 256 (Charpy impact strength, notched type) on absolutely dried test pieces.

(Note 2) The tensile strength, Young's modulus and elongation were measured at a temperature of 20°C. according to the provision of ASTM D 638 on absolutely dried test pieces.

(Note 3) The flexural strength and flexural modulus were measured at a temperature of 20°C. according to the provision of ASTM D 790 on absolutely dried test pieces.

COMPARATIVE EXAMPLES 3 to 4

The same procedures as in Example 1 were repeated except that dried crumb of styrene-butadiene copolymer having about 25% by weight of styrene (Comparative Example 3) or dried crumb of acrylonitrile-butadiene copolymer having about 30% by weight of acrylonitrile (Comparative Example 4) was respectively employed instead of the polyester-elastomer.

The impact strength at 20°C. in each case was 4.5 kg.cm./cm. and 4.9 kg.cm./cm., respectively, and rather inferior to the case of the hydrolyzed ethylene-vinyl acetate copolymer alone.

COMPARATIVE EXAMPLE 5

The same procedure as in Example 1 was repeated except that pelletized ethylene-vinyl acetate copolymer having an ethylene content of 82% by mole and vinyl acetate content of 12% by mole was employed instead of the polyester-elastomer.

The impact-resistance at 20°C. was only 4.8 kg.cm./cm., and moreover the tensile strength, elongation and flexural strength lowered to 320 kg./cm.$^2$, 11% and 600 kg./cm.$^2$, respectively, so that the molding was unsatisfactory to use practically.

EXAMPLES 2 to 5

The same procedures as in Example 1 were repeated except that the polyester-elastomer was incorporated into 100 parts of hydrolyzed ethylene-vinyl acetate copolymer having the composition as shown in Table 2 in an amount as shown in Table 2.

The results were shown in Table 2.

Table 2

| | Hydrolyzed ethylene-vinyl acetate copolymer | | Amount of polyester-elastomer | Impact strength | | Tensile strength | Flexural strength |
|---|---|---|---|---|---|---|---|
| | Ethylene content % by mole | Degree of hydrolysis % by mole | parts by weight | 20°C. kg.cm./cm. | −20°C. | kg./cm$^2$. | kg./cm$^2$. |
| Ex. 2 | 30 | 99.5 | 10 | 13.2 | 12.5 | 740 | 1210 |
| Ex. 3 | 22 | 99.5 | 65 | 14.5 | 13.5 | 770 | 950 |
| Ex. 4 | 25 | 99.2 | 10 | 13.0 | 12.0 | 820 | 1360 |
| Ex. 5 | 40 | 98.9 | 10 | 13.5 | 13.0 | 660 | 1070 |

EXAMPLE 6

The same procedure as in Example 1 was repeated except that 10 parts of PELPRENE P40B made by Toyobo Co., Ltd. (polyester-elastomer having melting point of crystalline region of 185°C. and impact resilience of 81%) was employed instead of 35 parts of PELPRENE P70B.

The results were as follows:

| | |
|---|---|
| Impact strength at 20°C.: | 12.5 kg.cm./cm. |
| Impact strength at −20°C.: | 12.0 kg.cm./cm. |
| Tensile strength: | 720 kg./cm$^2$. |
| Flexural strength: | 1,150 kg./cm$^2$. |

EXAMPLE 7

The same procedure as in Example 6 was repeated except that PELPRENE P30B made by Toyobo Co., Ltd. (polyester-elastomer having melting point of crystalline region of 170°C. and impact resilience of 86%) was employed instead of PELPRENE P40B.

The results were as follows:

| | |
|---|---|
| Impact strength at 20°C.: | 13.0 kg.cm./cm. |
| Impact strength at −20°C.: | 12.0 kg.cm./cm. |
| Tensile strength: | 720 kg./cm$^2$. |
| Flexural strength: | 1,100 kg./cm$^2$. |

EXAMPLE 8

The same procedure as in Example 1 was repeated except that HYTREL 5555 made by E. I. du Pont de Nemours and Company (polyester-elastomer having melting point of crystalline region of 211°C. and impact resilience of 65%) was employed instead of PELPRENE P70B.

The results were as follows:

| | |
|---|---|
| Impact strength at 20°C.: | 11.0 kg.cm./cm. |
| Impact strength at −20°C.: | 10.5 kg.cm./cm. |
| Tensile strength: | 720 kg./cm$^2$. |
| Flexural strength: | 1,130 kg./cm$^2$. |

EXAMPLE 9

A V-type blender was charged with 100 parts of pelletized hydrolyzed ethylene-vinyl acetate copolymer ($[\eta]$=1.17 dl./g.) having ethylene content of 25% by mole, vinyl acetate content of 75% by mole and degree of hydrolysis in vinyl acetate component of 99.0% by mole, 5 parts of pelletized HYTREL 5555 and 5 parts of pelletized ethylene-vinyl acetate copolymer having ethylene content of 80% by mole and vinyl acetate content of 20% by mole, and they were mixed for 20 minutes.

Then the mixture was provided into an injection molding machine of 3.5 oz.avdp. and the injection molding was carried out to give test pieces under the following molding conditions; nozzle temperature: 230°C., cylinder temperature at the front part: 240°C., cylinder temperature at the rear part: 190°C., mold temperature: 60°C., injection pressure: 100 kg./cm.$^2$, and one cycle: 37 sec.

Physical properties of thus obtained test piece were as follows:

| | |
|---|---|
| Impact strength at 20°C.: | 12.5 kg.cm./cm. |
| Impact strength at −20°C.: | 12.0 kg.cm./cm. |
| Tensile strength: | 710 kg./cm$^2$. |
| Flexural strength: | 1,100 kg./cm$^2$. |

What we claim is:

1. A molding having an improved impact-resistance which comprises a hydrolyzed ethylene-vinyl acetate copolymer and 2 to 100 parts by weight of a block-copolymerized polyester-polyether elastomer per 100 parts by weight of said copolymer; said hydrolyzed ethylene-vinyl acetate copolymer having an ethylene content of 20 to 50% by mole, a vinyl acetate content of 80 to 50% by mole and a degree of hydrolysis in vinyl acetate component of not less than 90% by mole, and said block-copolymerized polyester-polyether elastomer having a melting point of crystalline region of 150° to 230°C. and an impact resilience of not less than 50%.

2. The molding of claim 1, in which 0.5 to 10 parts by weight of ethylene-vinyl acetate copolymer is further incorporated per 100 parts by weight of the hydrolyzed ethylene-vinyl acetate copolymer; said ethylene-vinyl acetate copolymer consisting of 60 to 90% by mole of ethylene and 40 to 10% by mole of vinyl acetate.

3. The molding of claim 1, wherein said block-copolymerized polyester-polyether elastomer is present in an amount of 5 to 50 parts by weight per 100 parts by weight of the hydrolyzed ethylene-vinyl acetate copolymer.

4. The molding of claim 1, wherein said hydrolyzed ethylene-vinyl acetate copolymer has an ethylene content of 25 to 40% by mole, a vinyl acetate content of 75 to 60% by mole and a degree of hydrolysis in vinyl acetate component of not less than 95% by mole.

5. A process for preparing a molding having an improved impact-resistance which comprises incorporating 2 to 100 parts by weight of a block-copolymerized polyester-polyether elastomer into 100 parts by weight of a hydrolyzed ethylene-vinyl acetate copolymer to give a molding composition and melt-molding the composition at a temperature of 180° to 270°C.; said hydrolyzed ethylene-vinyl acetate copolymer having an ethylene content of 20 to 50% by mole, a vinyl acetate content of 80 to 50% by mole and a degree of hydrolysis in vinyl acetate component of not less than 90% by mole, and said block-copolymerized polyester-polyether elastomer having a melting point of crystalline region of 150° to 230°C. and an impact resilience of not less than 50%.

* * * * *